(12) United States Patent
Seo

(10) Patent No.: US 9,959,685 B2
(45) Date of Patent: *May 1, 2018

(54) METHOD AND SYSTEM FOR SELECTIVELY BLENDING BUILDINGS TO IMPROVE ROUTE VISIBILITY IN A 3D NAVIGATION SYSTEM

(71) Applicant: Thinkware Corporation, Gyeonggi-do (KR)

(72) Inventor: Jung Kak Seo, Seoul (KR)

(73) Assignee: THINKWARE CORPORATION, Seongnam-si, Gyeonggi-Do (KR)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/405,865

(22) Filed: Jan. 13, 2017

(65) Prior Publication Data

US 2017/0132847 A1 May 11, 2017

Related U.S. Application Data

(63) Continuation of application No. 14/365,852, filed as application No. PCT/KR2012/010861 on Dec. 13, 2012, now Pat. No. 9,568,333.

(30) Foreign Application Priority Data

Dec. 16, 2011 (KR) .......................... 10-2011-0136385

(51) Int. Cl.
*G06T 19/20* (2011.01)
*G06T 15/50* (2011.01)
(Continued)

(52) U.S. Cl.
CPC .......... *G06T 19/20* (2013.01); *G01C 21/3638* (2013.01); *G01C 21/3676* (2013.01);
(Continued)

(58) Field of Classification Search
CPC ............................ G06T 19/20; G01C 21/3629
(Continued)

(56) References Cited

U.S. PATENT DOCUMENTS

| | | | |
|---|---|---|---|
| 6,049,753 A | 4/2000 | Nimura | |
| 2007/0276597 A1* | 11/2007 | Kato ................. | G01C 21/3629 701/431 |
| 2008/0162043 A1 | 7/2008 | Emoto et al. | |

FOREIGN PATENT DOCUMENTS

| | | |
|---|---|---|
| JP | H0962179 A | 3/1997 |
| JP | 2001108458 A | 4/2001 |

(Continued)

OTHER PUBLICATIONS

English Translation for JP2008014975A.*
International Search Report in International Application No. PCT/KR2012/010861, Filed Dec. 13, 2012.

*Primary Examiner* — Mahmoud S Ismail
(74) *Attorney, Agent, or Firm* — Saliwanchik, Lloyd & Eisenschenk

(57) ABSTRACT

The present invention relates to a method and system for selectively blending buildings to improve route visibility in a 3D navigation system. A method for displaying a 3D map may include: detecting whether or not an object to be displayed on a map screen intersects with a route guiding line on the map screen with the object intersecting the route guiding line being blended therewith.

17 Claims, 4 Drawing Sheets

(51) Int. Cl.
| | |
|---|---|
| *G06T 17/05* | (2011.01) |
| *G01C 21/36* | (2006.01) |
| *G06K 9/52* | (2006.01) |
| *G06T 3/40* | (2006.01) |
| *G06T 17/10* | (2006.01) |
| *G06T 19/00* | (2011.01) |
| *G01C 21/30* | (2006.01) |
| *G01C 21/32* | (2006.01) |
| *G01C 21/34* | (2006.01) |

(52) U.S. Cl.
CPC ............... *G06K 9/52* (2013.01); *G06T 3/40* (2013.01); *G06T 15/503* (2013.01); *G06T 17/05* (2013.01); *G06T 17/10* (2013.01); *G06T 19/003* (2013.01); *G06T 19/006* (2013.01); *G01C 21/3484* (2013.01); *G06T 2200/04* (2013.01); *G06T 2219/2024* (2013.01)

(58) Field of Classification Search
USPC .................................. 701/436, 431, 211
See application file for complete search history.

(56) References Cited

FOREIGN PATENT DOCUMENTS

| | | | | |
|---|---|---|---|---|
| JP | 2003302224 | A | 10/2003 | |
| JP | 2007255989 | A | 10/2007 | |
| JP | 2008014975 | A * | 1/2008 | ......... G01C 21/3638 |
| JP | 4333704 | B2 | 9/2009 | |
| KR | 1020060127135 | A | 12/2006 | |

* cited by examiner

| Scale | Inspection area (radius) | Route reduced distance |
|---|---|---|
| 1/10m | 1km | 400m |
| 1/25m | 1.5km | 500m |
| 1/50m | 2km | 600m |
| 1/200m | 2km | 800m |
| 1/400m | Unprocessed | Unprocessed |

METHOD AND SYSTEM FOR SELECTIVELY BLENDING BUILDINGS TO IMPROVE ROUTE VISIBILITY IN A 3D NAVIGATION SYSTEM

CROSS-REFERENCE TO RELATED APPLICATIONS

This application is a continuation of Ser. No. 14/365,852, filed Jun. 16, 2014, which is the U.S. national stage application of International Patent Application No. PCT/KR2012/010861, filed Dec. 13, 2012; which claims priority to Korean Application No. 10-2011-0136385, filed Dec. 16, 2011; the disclosures of each of which are incorporated herein by reference in their entirety.

BACKGROUND OF THE INVENTION

Field of the Invention

Embodiments of the present invention relate to a method and system for displaying a three-dimensional (3D) map to improve a route visibility in a 3D navigation system.

Description of Related Art

In a three-dimensional (3D) navigation system, all the digital maps may be three-dimensionally represented. Representing, for example, buildings, mountains, and hills on such a 3D map may be a good way to represent information. In addition, the 3D navigation system may display a route on a 3D map, thereby guiding a road on which a vehicle is to drive. However, the field of view of a display screen is occluded by, for example, buildings, mountains, and hills and thereby limited, which may cause predetermined information to be limitedly represented. For example, when displaying a route on a 3D map, the route may be occluded by an object having a height value, for example, a 3D object, for example, a building and other road facility. Accordingly, in many cases, a heading direction cannot be known.

To outperform the aforementioned phenomena, the 3D navigation system has employed a technology for 1) blending all the 3D objects present around crossroads, or 2) blending a 3D object present in a heading direction of a route among the 3D objects around the crossroads. However, many of the 3D objects around the crossroads may be blended and thus, the overall map display quality may be degraded due to unnecessary blending processing. In addition, referring to FIG. 1, in the case of a road having a relatively high curved level, not being around the crossroads, a route 101 is still occluded by neighboring sky-high buildings 103 and thus, the visibility of the route 101 is not secured.

Accordingly, there is a need for a system and method for more effectively blending a 3D object.

SUMMARY OF THE INVENTION

Subjects to be Solved

An embodiment of the present invention provides a method and system for displaying a three-dimensional (3D) map that may selectively remove or blend a 3D object occluding a route regardless of whether it is around crossroads.

An embodiment of the present invention also provides a method and system for displaying a 3D map that may reduce an amount of calculation used to three-dimensionally represent a digital map and thereby readily perform real-time processing.

Solutions to be Carried Out

According to an aspect of the present invention, there is provided a system for displaying a three-dimensional (3D) map, the system including: an object detector configured to determine whether an object to be displayed on a map screen intersects a route guiding line; and a display configured to display the object and the route guiding line on the map screen, and to blend the object intersecting the route guiding line.

According to an aspect, the object detector may detect the object intersecting the route guiding line by determining whether a polygon corresponding to the object and a virtual polygon corresponding to the route guiding line intersect.

According to another aspect, the virtual polygon may be configured by connecting a vertex constituting a polyline corresponding to the route guiding line and a camera view of the map screen.

According to still another aspect, the polygon corresponding to the object may use a polygon configured as a regular hexahedron.

According to still another aspect, the object detector may be configured to set a detection area for detecting the object intersecting the route guiding line based on a map scale level displayed on the map screen.

According to still another aspect, the 3D map display system may further include a reducer configured to perform reduction on data of a polyline corresponding to the route guiding line. Here, the object detector may be configured to detect the object intersecting the route guiding line based on the reduced data of the polyline.

According to still another aspect, the reducer may be configured to perform an operation of reducing the number of vertices using an orthogonal distance between a straight line connecting both end points among vertices constituting the polyline of the route guiding line and an internal vertex excluding the both end points.

According to still another aspect, the reducer may be configured to perform reduction on the route guiding line of a unit length divided based on a map index unit.

According to still another aspect, the reducer may be configured to perform reduction on the route guiding line of a portion displayed on the map screen.

According to still another aspect, the reducer may be configured to set a length of the route guiding line for performing the reduction based on a map scale level displayed on the map screen.

According to another aspect of the present invention, there is provided a method of displaying a 3D map, the method including: determining whether an object to be displayed on a map screen intersects a route guiding line; and displaying the object and the route guiding line on the map screen, and blending the object intersecting the route guiding line.

Effects of Invention

According to embodiments of the present invention, it is possible to maximally maintain the quality of map display and to improve the route visibility by determining whether a route and a three-dimensional (3D) object intersect, and by selectively blending only a 3D object occluding the route.

According to embodiments of the present invention, it is possible to reduce an amount of calculation during an operation process and thereby effectively perform real-time processing by reducing data of a polyline used to constitute a polygon.

According to embodiments of the present invention, it is possible to quickly display a 3D map by limiting a length of a route to which reduction of data is to be applied and a radius for inspecting a 3D object intersecting the route, based on a map scale level.

DESCRIPTION OF SPECIFIC EMBODIMENTS

Hereinafter, embodiments of the present invention will be described in detail with reference to the accompanying drawings.

The embodiments relate to a three-dimensional (3D) map display system and method for selectively blending a neighboring object during a process of displaying a route guiding line on a map screen in a 3D navigation system.

A system and method for displaying a 3D map display system and method according to embodiments of the present invention may be applicable to a navigation system. The embodiments may be configured as an application exclusive for a mobile terminal, for example, a smart phone and a tablet.

The term "route guiding line" used herein may refer to a guiding line illustrated in a linear form on a road in order to guide a direction on a map screen. Also, the term "object" may refer to any type of objects having a height value, for example, a building and other facility three-dimensionally displayed on the map screen and hereinafter, is referred to as a "3D object".

Figure 1:
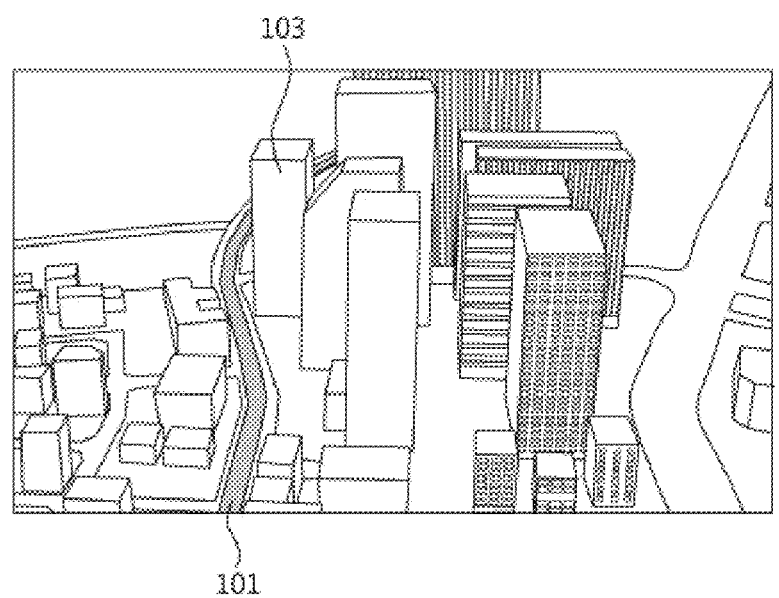
FIG. 1 illustrates a screen describing a phenomenon in which a route is occluded by a three-dimensional (3D) object with a height.
Figure 2:
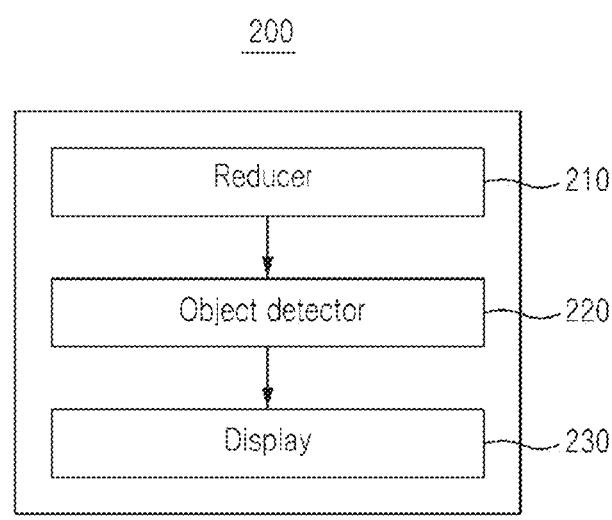
FIG. 2 is a block diagram illustrating a configuration of a 3D map display system for selectively processing a 3D object occluding a route according to an embodiment of the present invention.

FIG. 2 is a block diagram illustrating a configuration of a 3D map display system 200 for selectively processing a 3D object occluding a route according to an embodiment of the present invention.

Referring to FIG. 2, the 3D map display system 200 may include a reducer 210, an object detector 220, and a display 230.

In a 3D map environment, a large number of 3D objects are basically displayed on a map basically, and a route guiding line and a 3D object include a large number of polygons. Therefore, a large amount of calculation is used to three-dimensionally represent a digital map. Due to difficulty in real-time processing, performance of a navigation system may be degraded.

According to the embodiment, it is possible to reduce an amount of calculation and thereby readily perform real-time processing by reducing data of a route guiding line, by limiting a 3D object that is an inspection target used to determine whether the 3D object intersects the route guiding line, and by determining whether the 3D object and the route guiding line intersect based on the reduced data of the route guiding line and the limited 3D object.

The reducer 210 may serve to perform reduction on data of a polyline corresponding to the route guiding line. In general, in the navigation system, the route guiding line is configured as data in a polyline form. To three-dimensionally represent the route guiding line, the route guiding line needs to be generated using a polygon. Accordingly, the number of vertices of the route guiding line may increase by minimum twice or more. When reducing data of the polyline used to generate a polygon, storing the reduced data, and using the reduced data to determine whether the route guiding line intersects a 3D object, an amount of calculation may be significantly reduced.

Figure 3:
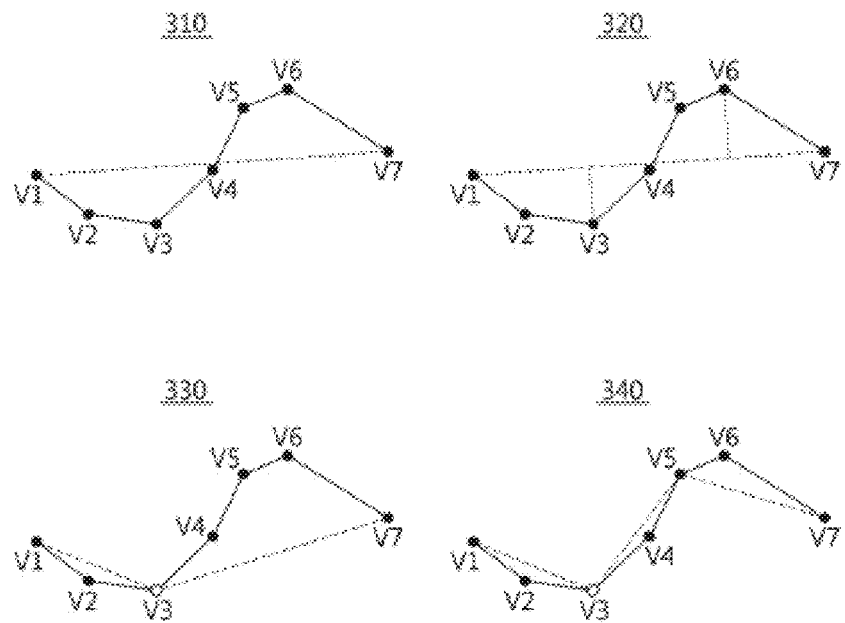
FIG. 3 illustrates a process of reducing data of a route visible on a screen according to an embodiment of the present invention.

For example, the reducer 210 may perform an operation of reducing the number of vertices using an orthogonal distance between a straight line connecting both end points among vertices constituting the polyline of the route guiding line and an internal vertex excluding the both end points. For example, referring to FIG. 3, when a polyline corresponding to a route guiding line is assumed to include seven vertices v1, v2, v3, v4, v5, v6, and v7, a straight line connecting both end points v1 and v7 is obtained in a first operation 310. In a second operation 320, a distance, for example, an orthogonal distance between the straight line obtained in the first operation 310 and an internal point is obtained. In a third operation 330, the polyline is divided into two polylines based on a vertex corresponding to the largest orthogonal distance between a vertex and the straight line. In this example, when an orthogonal distance between v3 and the straight line is largest, the polyline may be divided into a polyline including v1, v2, and v3, and a polyline v3, v4, v5, v6, and v7, based on v3. The aforementioned first operation 310, second operation 320, and third operation 330 may be repeatedly performed on each divided polyline. When an orthogonal distance value between a vertex and the straight line is less than a threshold, a reduction operation is terminated in a final operation 340. Accordingly, the number of vertices of the polyline including seven vertices v1, v2, v3, v4, v5, v6, and v7 may be reduced from seven to four, for example, v1, v3, v5, and v7 and thus, the polyline of the route guiding line may be reduced.

An amount of calculation may need to be minimized for real-time processing and thus, a polyline reduction operation may be applied to a route guiding line visible on the map screen. Accordingly, since route guiding line data is divided based on a map index unit, for example, 5 km, the reducer 210 may perform the polyline reduction operation on route guiding line data (hereinafter, referred to as a "unit route") with a unit length divided based on a map index unit. In addition, the reducer 210 may determine whether the unit route is displayed on the map screen, and may apply the polyline reduction operation to the unit route of a portion displayed on the map screen.

The object detector 220 may determine whether a 3D object to be displayed on the map screen intersects the route guiding line. Here, the object detector 220 may detect the 3D object intersecting the route guiding line, using the data of the polyline reduced by the reducer 210. Also, according to the embodiment, polygons constituting an optimal box, for example, a regular hexahedron including the 3D object may be utilized to minimize the number of polygons constituting the 3D object.

Figure 4:
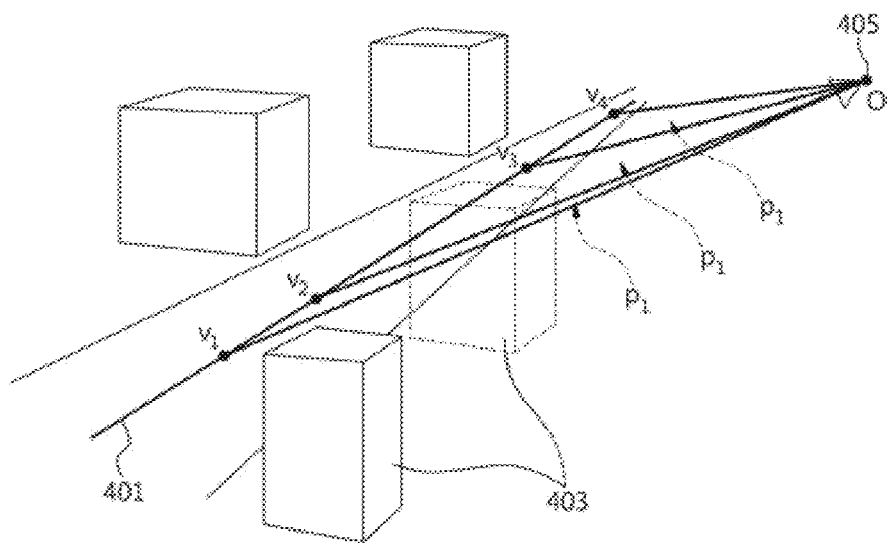
FIG. 4 is a diagram describing a process of determining whether a route and a 3D object intersect according to an embodiment of the present invention.

For example, the object detector 220 may detect a 3D object intersecting a route guiding line by configuring a virtual polygon by connecting a vertex constituting a polyline corresponding to the route guiding line and a camera view of a map screen, and by determining whether a polygon corresponding to the 3D object and the virtual polygon intersect. For example, referring to FIG. 4, when vertices constituting a polyline 401 of a route guiding line include {v1, v2 . . . vn} and a camera view 405 is O, virtual polygons pi (p1, p2, p3) are configured by connecting two adjacent vertices among the vertices of the polyline 401 to the camera view O {vi, vi+1, O}(here, i<N). Accordingly, the object detector 220 may detect a 3D object 403 indicated by a dotted line and occluding the route guiding line by determining whether the virtual polygon pi and a polygon constituting the 3D object intersect.

Figures 5, 6:
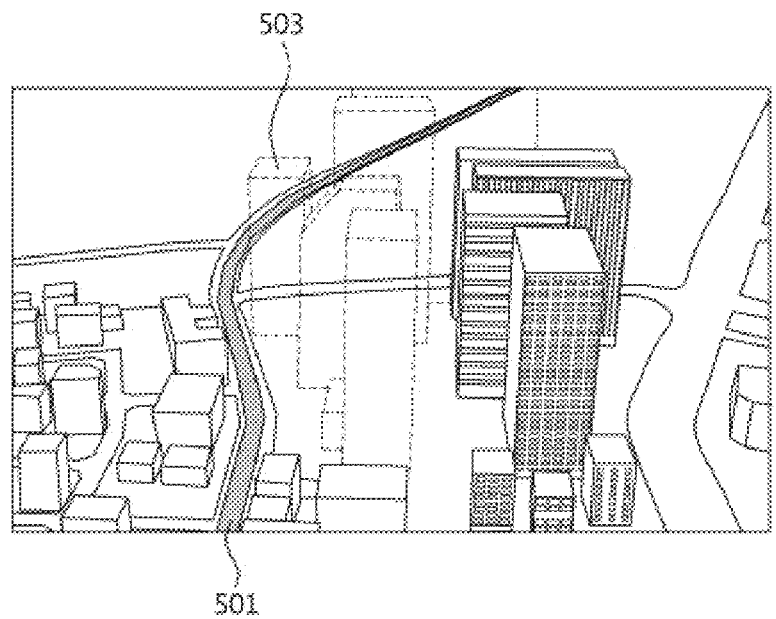
FIG. 5 illustrates an example of a screen on which a 3D object occluding a route is selectively blended according to an embodiment of the present invention.
FIG. 6 is a table showing an inspection area for each map scale and a route reduced distance according to an embodiment of the present invention.

The display 203 may display the 3D object and the route guiding line on the map screen, and in this instance, may selectively blend the 3D object intersecting the route guiding line. FIG. 5 illustrates an example of a map screen on which a 3D object occluding a route is blended. Referring to FIG. 5, when displaying a route guiding line 501 on a map screen, the display 230 may represent buildings actually present around the route guiding line 501 by applying the translucency effect, such as alpha blending, to a 3D object 503 occluding the route guiding line 501 and at the same time, may perform processing so that neighboring buildings may not occlude the route guiding line 501.

A navigation system may display even a significantly far distance on the map screen. Although a 3D object present in a far distance occludes a route guiding line, it may not become an issue. Meanwhile, in a 3D navigation system, a visible area may become wide while getting away from a camera view and thus, the number of inspection targets used to determine whether a corresponding target intersects a route guiding line may increase, which may lead to degradation in the performance. To consider the above situations, the scope of a processing area may be defined based on a map scale level and a processing target may be limited to a unit route and a 3D object present within the processing area. In other words, the object detector 220 may limit a 3D object corresponding to an inspection target by differently setting an inspection area, for example, a radius, for detecting a 3D object intersecting a route guiding line, based on a map scale level displayed on a map screen. In addition, when differently setting a threshold length, for example, a unit length, used by the reducer 210 for a reduction operation based on a map scale level, the number of inspection targets required for the operation process may be reduced. For example, FIG. 6 is a table showing an inspection area and a route reduced distance, for example, a unit length based on a map scale level. The reducer 210 and the object detector 220 may apply a table value corresponding to a map scale level. Here, each numerical value of the table may be obtained from experiments or experience.

Figure 7:
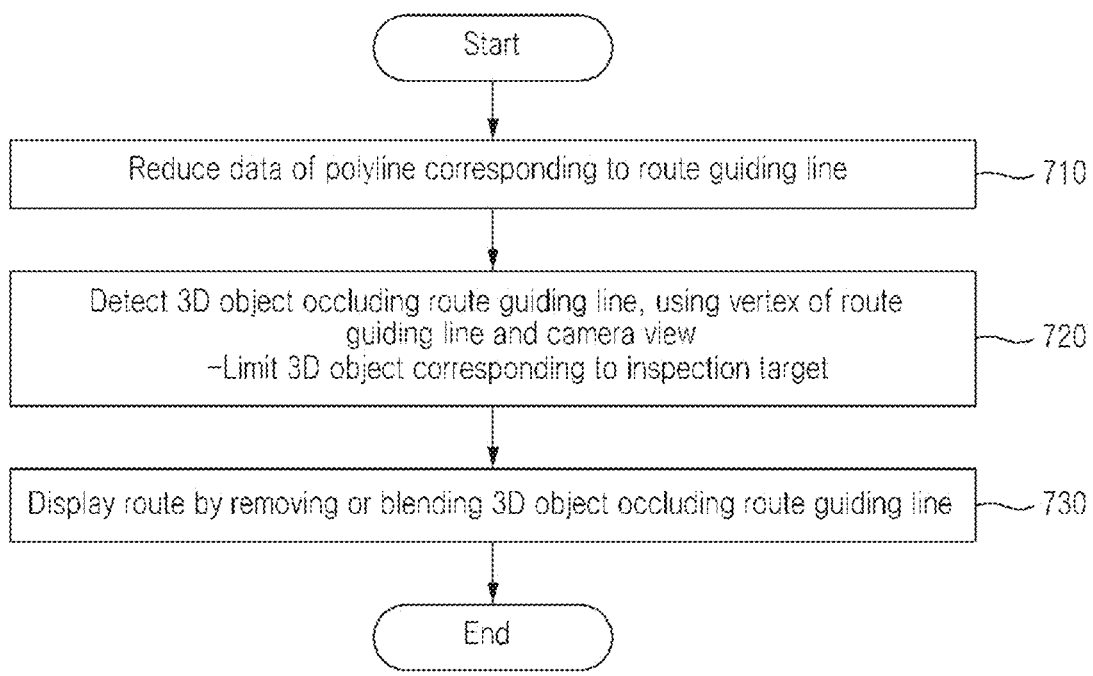
FIG. 7 is a flowchart illustrating a 3D map display method for selectively processing a 3D object occluding a route according to an embodiment of the present invention.

FIG. 7 is a flowchart illustrating a 3D map display method for selectively processing a 3D object occluding a route according to an embodiment of the present invention. The 3D map display method may be performed by a 3D map display system described above with reference to FIG.

In operation 710, the 3D map display system may perform a reduction operation on data of a polyline corresponding to a route guiding line. For example, the 3D map display system may perform an operation of reducing the number of vertices constituting the polyline using an orthogonal distance between a straight line connecting both end points among the vertices constituting the polyline of the route guiding line and an internal vertex excluding the both end points. In this instance, the 3D map display system may perform a polyline data reduction operation on the route guiding line with a unit length divided based on a map index unit. Also, the 3D map display system may set a length of the route guiding line for performing a reduction operation based on a map scale level displayed on a map screen. In addition, the 3D map display system may determine whether the route guiding line is displayed on the map screen, and may apply the polyline reduction operation to the route guiding line of a portion displayed on the map screen.

In operation 720, the 3D map display system may determine whether a 3D object to be displayed on the map screen intersects the route guiding line. For example, the 3D map display system may detect the 3D object intersecting the route guiding line by configuring a virtual polygon by connecting a vertex constituting the polyline corresponding to the route guiding line and a camera view of the map screen, and by determining whether the virtual polygon and a polygon corresponding to the object intersect. Here, the 3D map display system may detect the 3D object intersecting the route guiding line using data of the polyline reduced through the reduction operation. Also, the 3D map display system may determine whether the 3D object intersects the route guiding line by employing a polygon corresponding to the 3D object as a polygon configured as a regular hexahedron. The 3D map display system may limit a 3D object corresponding to an inspection target by differently setting an inspection area, for example, a radius, for determining whether the 3D object intersects the route guiding line, based on a map scale level displayed on the map screen.

In operation 730, the 3D map display system may display the 3D object and the route guiding line on the map screen and in this instance, may selectively blend the 3D object interesting the route guiding line. For example, when displaying a route guiding line on a map screen, the 3D map display system may represent buildings actual present around the route guiding line by apply the translucency effect, such as alpha blending, to a 3D object occluding the route guiding line and at the same time, may perform processing so that neighboring buildings may not occlude the route guiding line.

As described above, according to embodiments of the present invention, it is possible to maximally maintain the quality of map display and to improve the route visibility by selectively blending only a 3D object occluding a route. Also, according to embodiments of the present invention, it is possible to reduce an amount of calculation during an operation process and thereby effectively perform real-time processing by reducing data of a polyline used to constitute a polygon. Also, according to embodiments of the present invention, it is possible to quickly display a 3D map by limiting a length of a route to which reduction of data is to be applied and a radius for inspecting a 3D object intersecting the route based on a map scale level.

The embodiments according to embodiments of the present invention may be recorded in non-transitory computer-readable media including program instructions that may be executed through a variety of computer devices. The media may also include, alone or in combination with the program instructions, data files, data structures, and the like. The program instructions recorded in the media may be those specially designed and constructed for the purposes of the present invention, or they may be of the kind well-known and available to those having skill in the computer software arts. Also, the file system may be recorded in the non-transitory computer-readable media.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A system for displaying a three-dimensional (3D) map, the system comprising:
    a memory having computer readable instructions stored thereon; and
    at least one processor configured to execute the computer readable instructions to:
    determine whether an object to be displayed on a map screen intersects a route guiding line;
    display the object and the route guiding line on the map screen, and blend the object intersecting the route guiding line, wherein the at least one processor is configured to operate on a plurality of virtual polygons based on vertices comprising a polyline corresponding to the route guiding line and a camera view point of the map screen, each of the plurality of virtual polygons being formed by connecting two adjacent vertices of the vertices and the camera view point; and
    detect the object intersecting the route guiding line by determining whether a polygon corresponding to the object and each of the virtual polygons intersect.

2. The system of claim 1, wherein the polygon corresponding to the object is configured to be a regular hexahedron.

3. The system of claim 1, wherein the at least one processor is configured to set a detection area for detecting the object intersecting the route guiding line based on a map scale level displayed on the map screen.

4. The system of claim 1, wherein the at least one processor performs reduction on data of a polyline corresponding to the route guiding line, and
    wherein the at least one processor detects the object intersecting the route guiding line based on the reduced data of the polyline.

5. The system of claim 4, wherein the at least one processor is configured to perform an operation of reducing number of the vertices comprising the polyline by an orthogonal distance between a straight line connecting both end points among the vertices comprising the polyline and an internal vertex excluding the both end points.

6. The system of claim 4, wherein the at least one processor is configured to perform reduction on the route guiding line of a unit length divided based on a map index unit.

7. The system of claim 4, wherein the at least one processor is configured to perform reduction on the route guiding line of a portion displayed on the map screen.

8. The system of claim 4, wherein the at least one processor is configured to set a length of the route guiding line for performing the reduction based on a map scale level displayed on the map screen.

9. A method of displaying a three-dimensional (3D) map, the method comprising:
    determining whether an object to be displayed on a map screen intersects a route guiding line; and
    displaying the object and the route guiding line on the map screen, and blending the object intersecting the route guiding line;
    wherein the determining comprises configuring a plurality of virtual polygons based on vertices comprising a polyline corresponding to the route guiding line and a camera view point of the map screen, each of the plurality of virtual polygons being formed by connecting two adjacent vertices and the camera view point, and
    detecting the object intersecting the route guiding line by determining whether a polygon corresponding to the object and each of the virtual polygons intersect.

10. The method of claim 9, wherein the polygon corresponding to the object is configured to be a regular hexahedron.

11. The method of claim 9, wherein the determining comprises setting a detection area for detecting the object intersecting the route guiding line based on a map scale level displayed on the map screen.

12. The method of claim 9, further comprising:
    performing reduction on data of a polyline corresponding to the route guiding line,
    wherein the determining comprises detecting the object intersecting the route guiding line based on the reduced data of the polyline.

13. The method of claim 12, wherein the performing of the reduction comprises performing an operation of reducing number of the vertices comprising the polyline by an orthogonal distance between a straight line connecting both end points among the vertices comprising the polyline and an internal vertex excluding the both end points.

14. The method of claim 12, wherein the performing of the reduction comprises performing reduction on the route guiding line of a unit length divided based on a map index unit.

15. The method of claim 12, wherein the performing of the reduction comprises performing reduction on the route guiding line of a portion displayed on the map screen.

16. The method of claim 12, wherein the performing of the reduction comprises setting a length of the route guiding line for performing the reduction based on a map scale level displayed on the map screen.

17. Non-transitory computer-readable media storing a program to implement the method according to claim 9.

* * * * *